United States Patent
Oesterreicher et al.

(10) Patent No.: US 7,701,154 B2
(45) Date of Patent: Apr. 20, 2010

(54) ELECTRIC DRIVE SYSTEM

(75) Inventors: Florian Oesterreicher, Munich (DE);
Hans Glonner, Pfaffenhofen (DE);
Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/952,171

(22) Filed: Dec. 7, 2007

(65) Prior Publication Data

US 2008/0143279 A1    Jun. 19, 2008

Related U.S. Application Data

(63) Continuation of application No. PCT/EP2006/004925, filed on May 24, 2006.

(30) Foreign Application Priority Data

Jun. 10, 2005    (DE) .................. 10 2005 026 779

(51) Int. Cl.
*H02P 1/54*    (2006.01)
(52) U.S. Cl. .................. 318/105; 318/106; 318/107; 318/34
(58) Field of Classification Search .................. 318/105, 318/440, 248, 123, 34, 404; 307/43, 18; 903/906, 909, 927, 940; 322/86; 701/1, 701/79
See application file for complete search history.

(56) References Cited

U.S. PATENT DOCUMENTS

| | | | | |
|---|---|---|---|---|
| 4,039,909 A | * | 8/1977 | Baker | 318/732 |
| 4,328,454 A | * | 5/1982 | Okuyama et al. | 318/803 |
| 4,349,772 A | * | 9/1982 | Weiss | 318/799 |
| 4,455,522 A | * | 6/1984 | Lipo | 318/809 |
| 5,050,059 A | * | 9/1991 | Neeser et al. | 363/65 |
| 5,140,246 A | * | 8/1992 | Rarick | 318/779 |
| 5,142,468 A | * | 8/1992 | Nerem | 363/71 |
| 5,182,508 A | * | 1/1993 | Schauder | 318/801 |
| 5,705,909 A | * | 1/1998 | Rajashekara | 318/801 |
| 6,198,183 B1 | | 3/2001 | Baeumel et al. | |
| 6,351,048 B1 | * | 2/2002 | Schob et al. | 310/90.5 |
| 6,768,237 B1 | * | 7/2004 | Schroedl | 310/114 |
| 7,049,716 B2 | | 5/2006 | Gruendl et al. | |
| 7,259,530 B2 | * | 8/2007 | Ochiai et al. | 318/105 |
| 2003/0193253 A1 | * | 10/2003 | Arimitsu et al. | 310/114 |

(Continued)

FOREIGN PATENT DOCUMENTS

DE    36 37 479 A1    5/1988

(Continued)

OTHER PUBLICATIONS

International Search Report dated Sep. 28, 2006 with English translation of relevant portion (Six (6) pages).

(Continued)

*Primary Examiner*—Rita Leykin
(74) *Attorney, Agent, or Firm*—Crowell & Moring LLP

(57) ABSTRACT

An electric drive system includes a multi-phase electric machine, multiple electrical power output stages, and devices for controlling and/or regulating the electric machine, which are connected to the electrical power output stages. At least two control units are provided for control and/or regulation, at least one power output stage group being assigned to each control unit.

6 Claims, 4 Drawing Sheets

U.S. PATENT DOCUMENTS

2004/0222754 A1 11/2004 Ochiai et al.
2005/0159861 A1* 7/2005 Iwatsuki et al. ............... 701/22

FOREIGN PATENT DOCUMENTS

| | | |
|---|---|---|
| DE | 198 17 333 C1 | 12/1999 |
| DE | 101 12 799 C1 | 10/2002 |
| EP | 0 577 980 B1 | 1/1994 |
| EP | 0 588 628 B1 | 3/1994 |
| EP | 0 947 377 A2 | 10/1999 |
| EP | 1 020 986 A1 | 7/2000 |
| EP | 1 103 409 A2 | 5/2001 |
| EP | 1 418 660 B1 | 5/2004 |
| EP | 1 521 356 A2 | 4/2005 |
| JP | 6-276778 A | 9/1994 |
| JP | 2001-136606 A | 5/2001 |
| JP | 2002-17004 A | 1/2002 |
| JP | 2002017004 * | 1/2002 |

OTHER PUBLICATIONS

German Search Report dated May 2, 2006 with English translation of relevant portion (Nine (9) pages).

* cited by examiner

ELECTRIC DRIVE SYSTEM

CROSS-REFERENCE TO RELATED APPLICATIONS

This application is a continuation of PCT International Application No. PCT/EP2006/004925, filed on May 24, 2006, which claims priority under 35 U.S.C. §119 to German Application No. 10 2005 026 779.3, filed Jun. 10, 2005, the entire disclosures of which are expressly incorporated by reference herein.

BACKGROUND AND SUMMARY OF THE INVENTION

The present invention relates to an electric drive system having a multi-phase electric machine, multiple electrical power output stages, and control units, which are connected to the electrical power output stages, for controlling and/or regulating the electric machine. Preferably, the electric machine is a component of a drive train for a motor vehicle, in particular for a motor vehicle having at least two different drive units, such as an internal combustion engine and an electric machine.

Electric machines for drive tasks are equipped with electronic controllers, which regulate the speed and power of the machine. Three-phase and two-phase multi-phase machines of various pole pair counts and DC current machines are the most widespread drives. Furthermore, machines having more than three-phase systems are known. All drives share the feature that for optimal exploitation of the drive, the electronic controllers and the electric machines must correspond in the number of phases.

Typical machines and controllers have a concentrated system structure (see FIG. 1), i.e., the number of the individual electrically executed phases and/or poles of the controller corresponds to the number of magnetically differentiable phases of the electric machine. To adapt the current and voltage between the power system and the electric drive, and for reasons of electric controllability, control elements and/or phases of the machines are connected in parallel or in series.

For complex drive tasks in traction and/or in automation technology, the drives are partially operated permanently or temporarily in parallel, i.e., they generate a joint torque output.

In addition, electric machines are known for hybrid drives, in which the execution as concentrated drives is dispensed with for reasons of installation space exploitation. For example, the power output stages of the electronic controller are situated as segments on the mantle of the electric machine for these drives. In a further embodiment, the segments are assigned as so-called half-bridges to individual phases of the electric machine. The separate activation of individual windings of electric machines using full bridges (H-bridge circuit) is also known. Embodiments of this type are known, for example, from DE 198 17 333 C1 or DE 101 12 799 C1.

In mobile drive technology, electric machines having inverter power are increasingly integrated in the drive train of a motor vehicle. The electric machines are frequently implemented as permanently excited synchronous machines, in which the terminal voltage of the electrical machine is sometimes higher than desired, which is problematic. The elevated terminal voltage is counteracted, for example, by the operation of the electric machine using field weakening. A current is applied using a regulating method, which has the result that the magnetic field active in the air gap is reduced. Alternatively or additionally, braking resistors (so-called brake choppers) may be used, excess electrical energy being converted into heat using an ohmic resistor. Alternatively or additionally, the excess energy may also be fed back in a targeted manner into an energy accumulator. However, these measures are only advantageous in a limited way. In the event of so-called field weakening, a controller breakdown may occur, by which the terminal voltage of the electric machine would again rise undesirably. Additional components are required for limiting the terminal voltage using braking resistors. An energy accumulator is necessary for the feedback of the excess electrical energy present because of the increased terminal voltage, for which it is ensured that it is always capable of absorbing the excess energy.

The present invention is based on the object of providing an electric drive system, by which the above-mentioned disadvantages are overcome. In particular, through the present invention, emergency operation of the electric machine is to be possible in the event of malfunction or breakdown of a control unit. The object is achieved according to the present invention by providing an electric drive system having a multi-phase electric machine, multiple electrical power output stages, and control units, which are connected to the electrical power output stages, for controlling and/or regulating the electric machine. At least two control units are provided for controlling and/or regulating, and each such control unit is assigned to at least one power output stage group.

High flexibility of the electric machine in regard to its controller and also increased security from breakdown are ensured by the use of multiple units for controlling and/or regulating (referred to in the following as control units) the electric machine and the assignment of control units to a power output stage group to switch at least one supply phase of the electric machine. A multipart electric machine (electrical machine having multiple integrated partial machines) is more or less provided by the present invention, in which each machine part (or each integrated partial machine) may be controlled and/or regulated autonomously. The partial machines, are preferably, partial stators, which act on a shared rotor.

The regulation of the overall drive is also partitioned and assigned to the individual partial motors. The drives are synchronized with one another by a higher-order setpoint value preset in particular, which distributes the setpoint value for the overall drive to the individual drives, and by the synchronization of the processor clocking of the individual controllers.

The synchronization of the individual drives, for example, via a master and subordinate slave controllers, is also specified as a further embodiment.

In another refinement, it is possible that master or slave regulation is not assigned directly to any electric machine, but rather the master or slave regulation and/or the control unit assigned to the electric partial machine is only used for processing measured and regulating variables. This is the case if multiple electric machines are already present, which ensure reliable partial operation of the system. It is then contemplated that further partial machines are provided, to which a passive control unit is solely assigned in such a way that it solely processes measured and regulating variables—but does not actively activate the partial machine assigned thereto.

In this way, on one hand emergency operation of the machine is ensured if the control unit assigned to a partial machine breaks down, and on the other hand every machine part may be controlled individually. For example, one machine part may be temporarily operated as a motor, while another machine part is operated as a generator—arbitrary activations are contemplated here.

In a preferred embodiment of the present invention, the (divided) electric machine is implemented as a multiphase electric machine (e.g., 2×3 phases), in which a power output stage (e.g., in the form of a power half-bridge) is assigned to each phase and a separate control unit (e.g., current regulation) is assigned to each of the two power output stage groups comprising three power output stages.

Through this construction according to the present invention of a (multipart) electric machine, a redundancy is provided which allows, in the event of breakdown or shutdown of one or more power output stages or one or more control units, the electrical machine to operate further via the remaining power output stages and/or the remaining control units and associated power output stages.

Other objects, advantages and novel features of the present invention will become apparent from the following detailed description of the invention when considered in conjunction with the accompanying drawings.

BRIEF DESCRIPTION OF THE DRAWINGS

In the following, the present invention is explained in greater detail on the basis of two possible exemplary embodiments in individual figures.

DETAILED DESCRIPTION OF THE DRAWINGS

Figure 1:
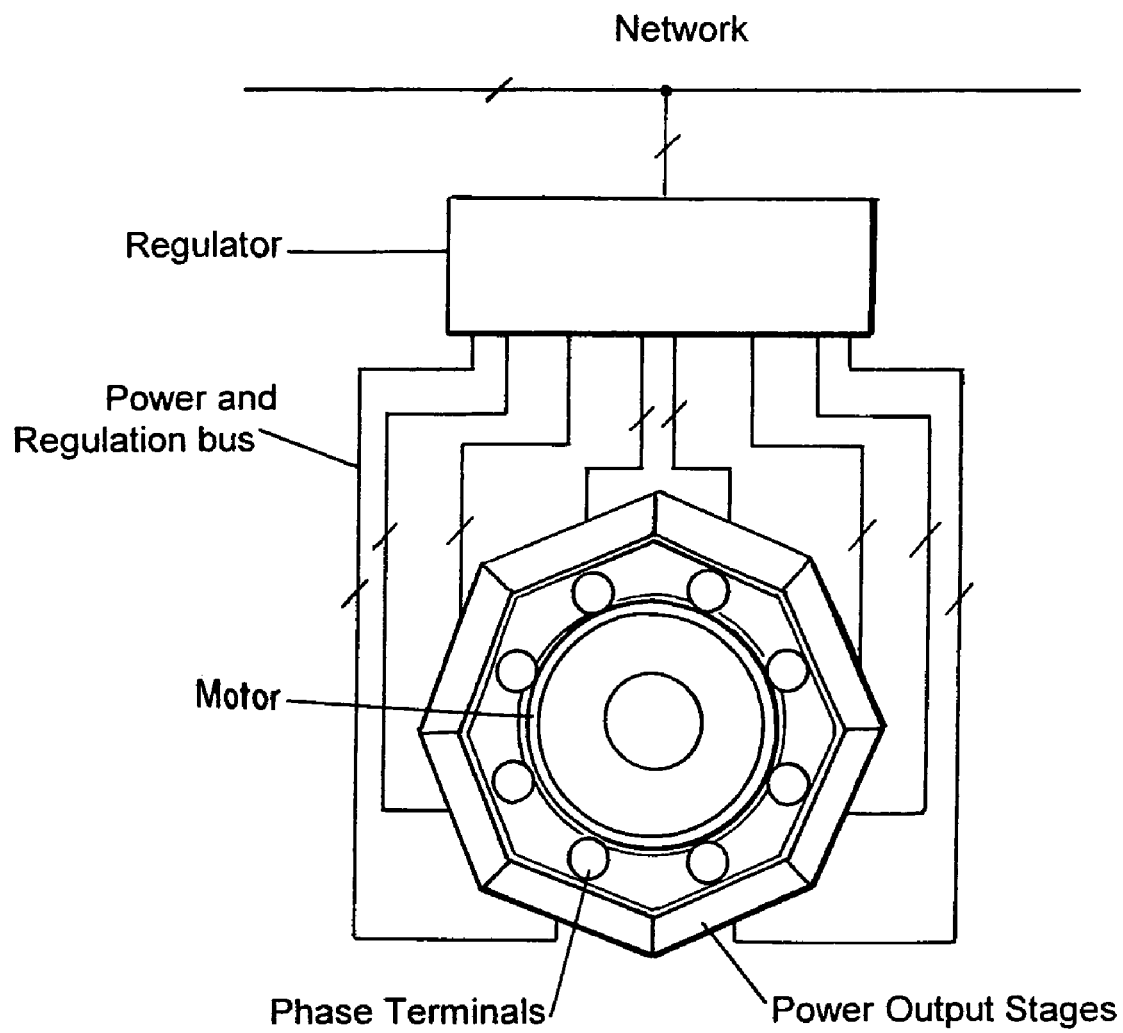
FIG. 1 shows an electrical drive device according to the prior art.
Figure 2A:
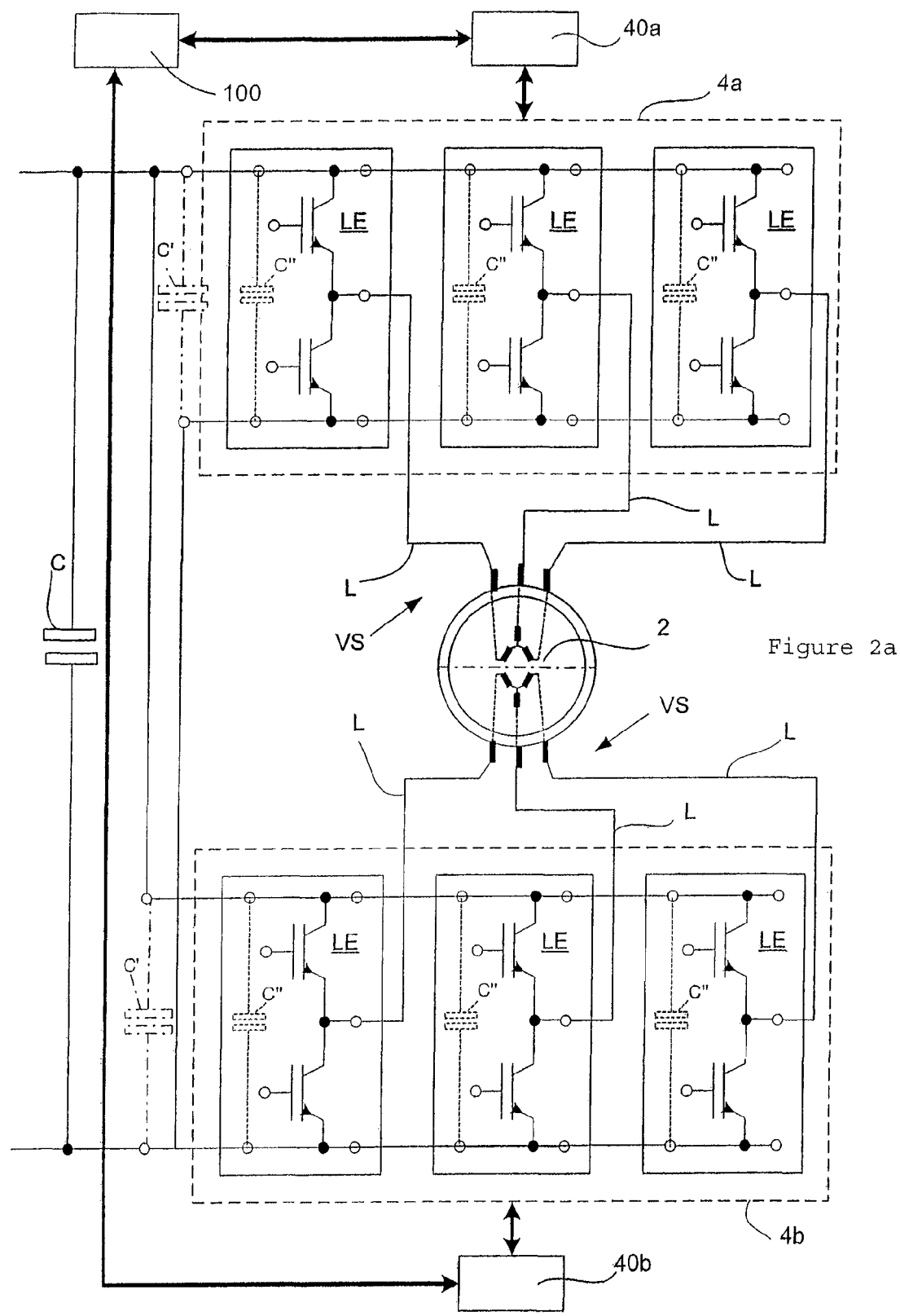
FIGS. 2a, 2b show an electrical drive device according to the present invention in a first embodiment in different illustrations.

FIG. 2a shows the electric drive system according to the present invention in a first embodiment having an electric machine 2 (comprising two partial machines here), two power output stage groups 4a, 4b, and two devices for controlling and/or regulating 40a, 40b (referred to in the following as control units).

The electric machine 2 is implemented in the present case as a multi-phase machine, in which multiple phases (three phases here) are assigned to a partial machine. For example, each phase VS comprises three supply lines L.

Each of the two power output stage groups 4a and 4b include three power output stages LE in the present case. Each of the power output stages LE is preferably implemented as a power half-bridge having a center tap, to which precisely one power output stage LE of a power output stage group 4a, 4b is assigned to each of the supply lines L of a supply phase VS. Furthermore, one power output stage group 4a, 4b is assigned to each supply phase VS, each power output stage group 4a, 4b including at least one power output stage LE in the meaning of the present invention. At least one control unit 40a, 40b is assigned to each power output stage group 4a, 4b, by which a redundancy is provided, which allows, in case of breakdown or shutdown of one or more power output stages LE, the remaining partial system(s) to operate further. The two power output stage groups 4a and 4b are coupled to one another via a capacitive storage device C (referred to in the following as an intermediate circuit capacitor). The shared intermediate circuit capacitor C is preferably situated between the shared collector terminal and the shared emitter terminal of the two power output stage groups 4a, 4b.

In another embodiment, the shared capacitor C assigned to the power output stages 4a, 4b may also be divided and a separate (smaller) capacitor C' (dot-dash lines) may be assigned to each individual power output stage group 4a, 4b or an individual capacitor C" (dashed lines) may be assigned to each individual power output stage LE. The particular proportional load of the partial capacitors is reduced in this way.

For the case in which the internal voltage (the voltage induced by the rotor in the stator coils) acting on the intermediate circuit at a partial machine, whose power output stage(s) no longer switch(es) because of a fault, is greater than the intermediate circuit voltage (voltage at the capacitor of the converter), a current is applied to the intermediate circuit capacitor C. The intermediate circuit capacitor C is charged in this manner. In the embodiment according to the present invention, this current is taken from the intermediate circuit capacitor C and applied to the still operating partial systems (power output stages of the intact partial machine(s)), by which the voltage at the intermediate circuit capacitor C is limited. Using a higher-order control and/or regulating unit 100, the current application to the still working partial systems (partial machines) may alternately be performed to produce torque or without torque.

In addition, as a function of the thermal design of the electric machine 2 and as a function of the maximum permissible intermediate circuit voltage and the current speed of the electric machine 2, permanent or temporary emergency operation of the electric machine 2 is possible. The maximum permissible intermediate circuit voltage is a function, inter alia, of the electric strength of the intermediate circuit capacitor C and the electric strength of the power accumulator connected to the intermediate circuit.

If the additional current possibly provided in emergency operation results in impermissible heating of the remaining partial machine, the speed of the electric machine 2 may be limited in a targeted way using the higher-order control unit 100. The limiting of the speed is performed, for example, by temporary decoupling of the electric machine 2 from the drive train or by limiting the speed of the second machine present in the drive train (an internal combustion engine here, for example) or by changing the transmission ratio between the electric machine 2 at the output and the drive train or by a combination of individual cited measures.

Figure 2B:
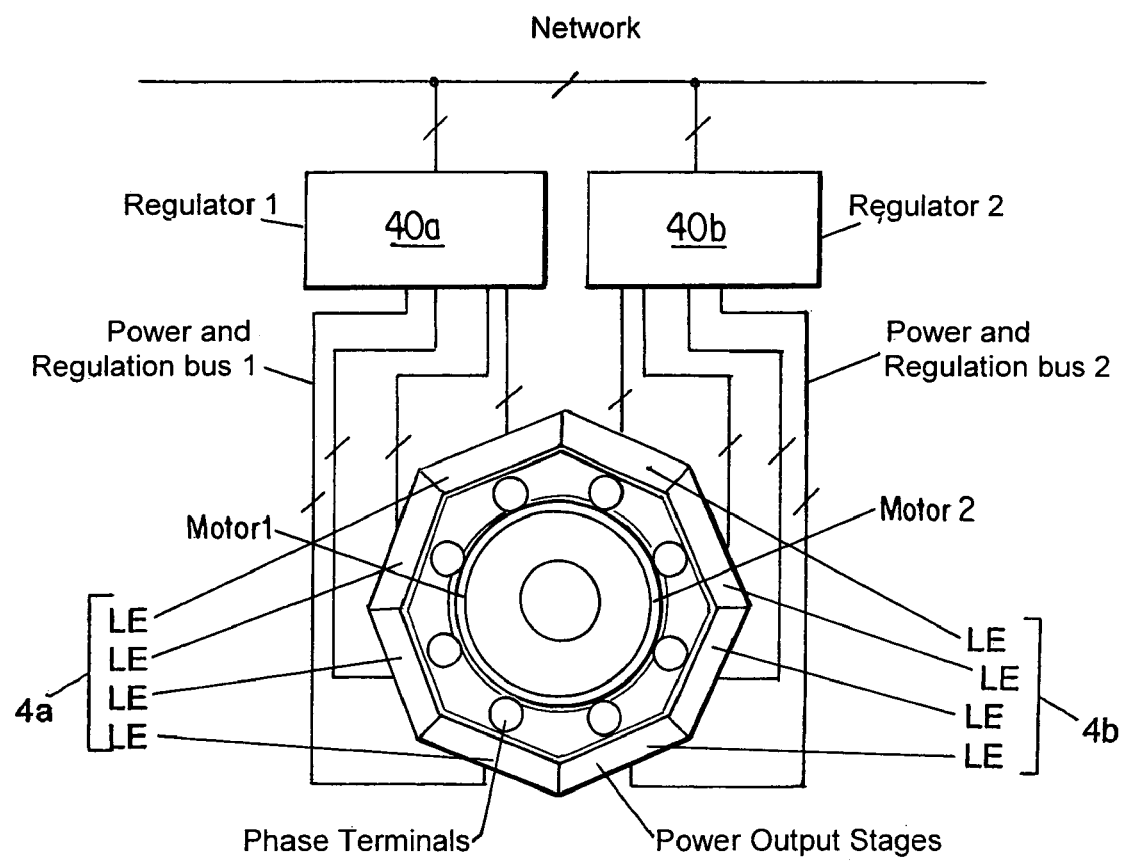

FIG. 2b illustrates the embodiment of the drive device according to the present invention already described according to FIG. 2a in another illustration for two, four-phase, partial motors.

Figure 3:
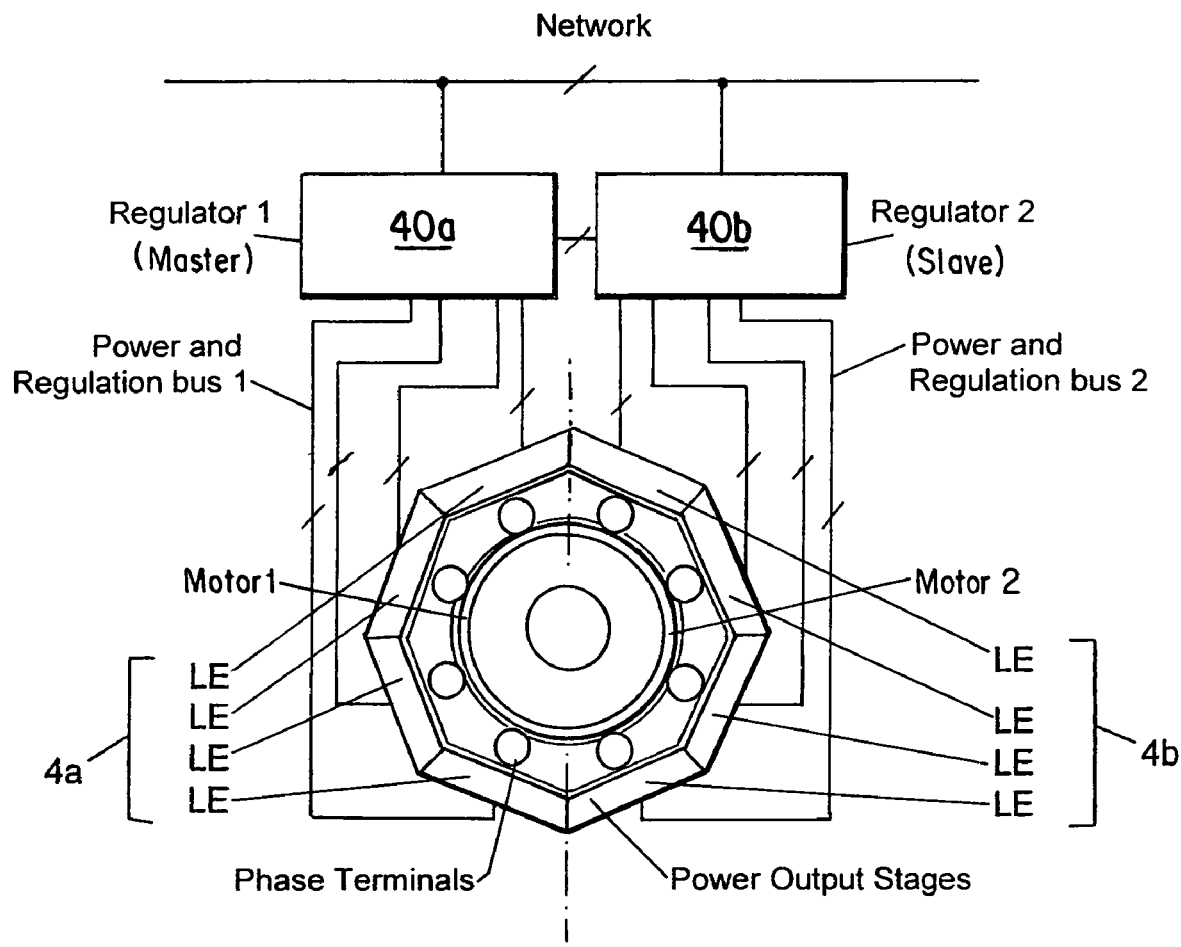
FIG. 3 shows an electrical drive device according to the present invention in a second embodiment.

A further possible embodiment of the electric drive system according to the present invention is illustrated in FIG. 3. Analogously to the illustration in FIG. 2b, two, four-phase, partial motors are schematically shown, each phase of each partial motor being assigned a power output stage LE and all power output stages LE of a partial motor each being assigned a control unit 40a, 40b. In the exemplary embodiment shown, one of the control units 40a; 40b is implemented as a master unit and the other control unit 40b; 40a is accordingly implemented as a slave unit coupled to the master unit.

The present invention is not restricted to the described exemplary embodiments, but rather also includes similarly acting embodiments, in which, for example, multiple supply lines L—for example, even an entire supply phase VS—are switched using one power output stage LE or vice versa, in which individual supply lines L are switched via multiple power output stages LE. The electric machine 2 may also include three or more partial machines and not only two partial machines as in the described exemplary embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric drive system, comprising:
   a multi-phase electric machine;
   multiple electrical power output stages;
   at least two control units operatively coupled to the electric power output stages, the control units providing at least one of control and regulation of the electric machine, wherein each control unit is assigned to at least one power output stage group, and the at least two control units are operatively configured in a master-slave relationship;
   at least one capacitive storage device operatively coupled between the power output stage groups to which the control units are assigned; and
   a higher-order control unit for controlling the at least two control units assigned to the power output stage groups, wherein the higher-order control unit and the at least two control units are operatively configured such that in an event of at least one power output stage breakdown or one power output stage group breakdown, an assigned current to the broke down power output stage or power output stage group is at least partially buffered in an intermediate circuit capacitor and fed, as necessary, into a remaining partial system.

2. An electric drive system, comprising:
   a multi-phase electric machine;
   multiple electrical power output stages;
   at least two control units operatively coupled to the electric power output stages, the control units providing at least one of control and regulation of the electric machine, wherein each control unit is assigned to at least one power output stage group, and the at least two control units are operatively configured in a master-slave relationship, wherein the at least two control units are operatively synchronized with one another; and
   at least one capacitive storage device operatively coupled between the power output stage groups to which the control units are assigned.

3. The electrical drive system according to claim 2, further comprising a higher-order control unit for controlling the at least two control units assigned to the power output stage groups.

4. The electrical drive system according to claim 3, wherein the higher-order control unit is operatively configured such that in an event of a power output stage breakdown or a power output stage group breakdown, an emergency operating mode is activatable, wherein a speed of the electric machine, in the emergency operating mode, being controlled by at least one of a temporary decoupling from a drive train, a speed limiting of a second drive unit of the drive train, and a transmission ration change between an output-side of the electric machine and the drive train.

5. The electric drive system according to claim 3, wherein the higher-order control unit and the at least two control units are operatively configured such that in an event of at least one power output stage breakdown or one power output stage group breakdown, an assigned current to the broke down power output stage or power output stage group is at least partially buffered in an intermediate circuit capacitor and fed, as necessary, into a remaining partial system.

6. An electric drive system, comprising:
   a multi-phase electric machine having partial stators configured to act on a rotor;
   multiple electrical power output stages coupled to the partial stators;
   at least two control units operatively coupled to the electric power output stages, the control units providing at least one of control and regulation of the electric machine, wherein each control unit is assigned to at least one power output stage group, the at least two control units are operatively configured in a master-slave relationship, wherein the at least two control units are operatively synchronized with one another;
   at least one capacitive storage device operatively coupled between the power output stage groups to which the control units are assigned; and
   a higher order controller coupled to the at least two control units and configured to provide machine part operation as a motor and generator.

* * * * *